Jan. 24, 1956     R. A. CLOTFELTER     2,732,470
FLUX CONTROL APPARATUS
Filed Oct. 25, 1954     2 Sheets-Sheet 1
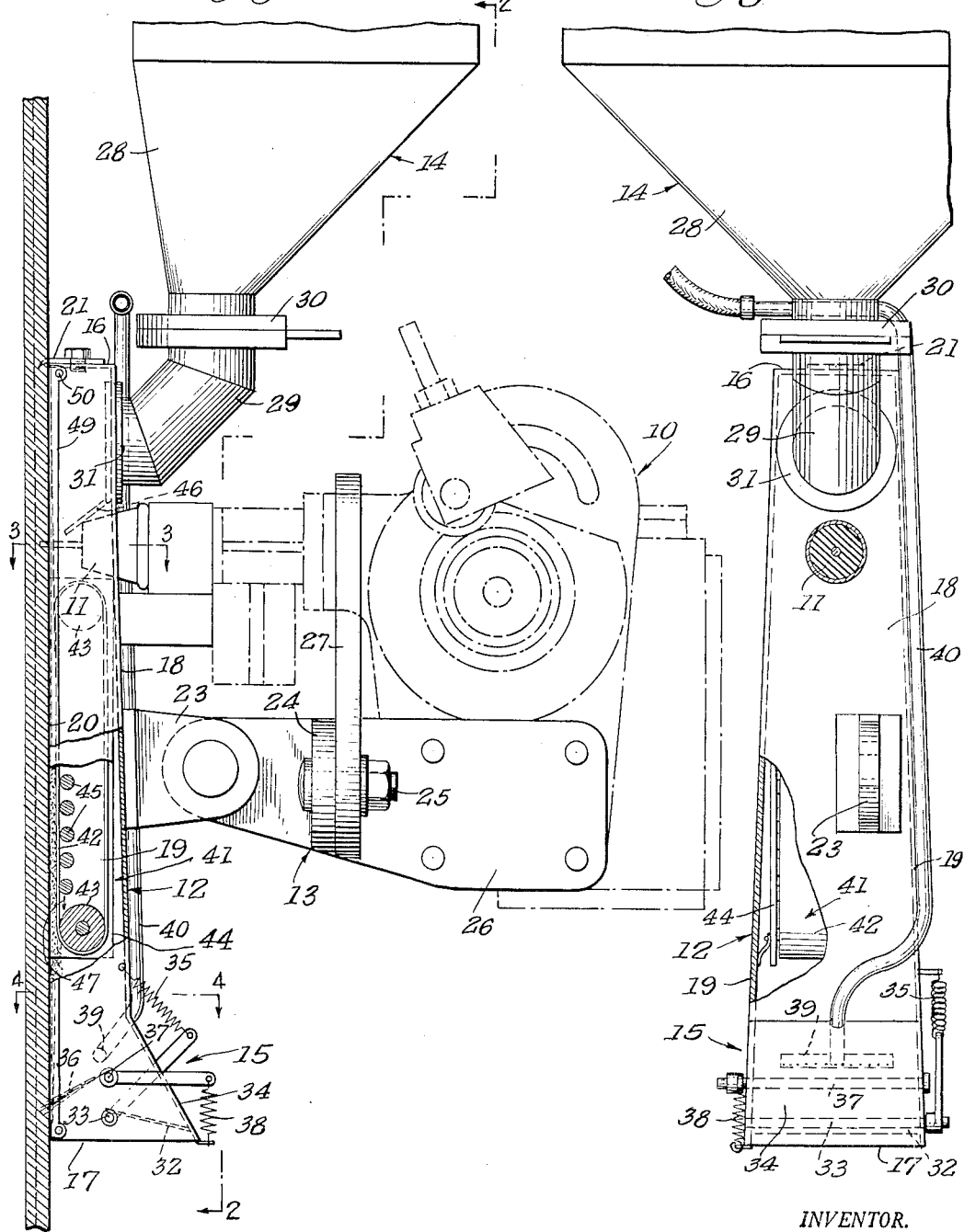
INVENTOR.
REA A. CLOTFELTER
BY
C. G. Stratton
ATTORNEY Jan. 24, 1956 R. A. CLOTFELTER 2,732,470
FLUX CONTROL APPARATUS
Filed Oct. 25, 1954 2 Sheets-Sheet 2
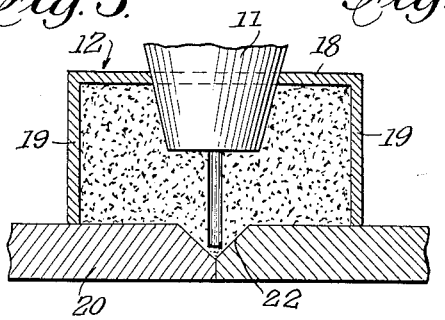
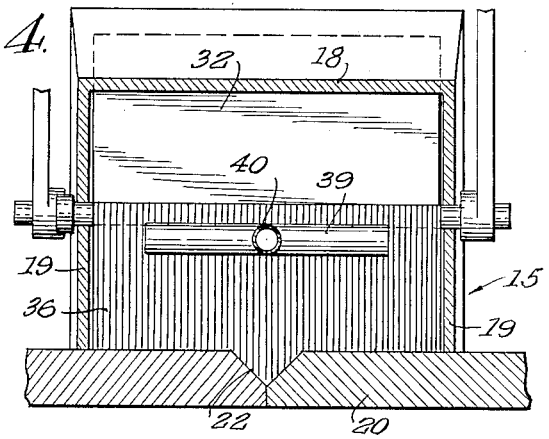
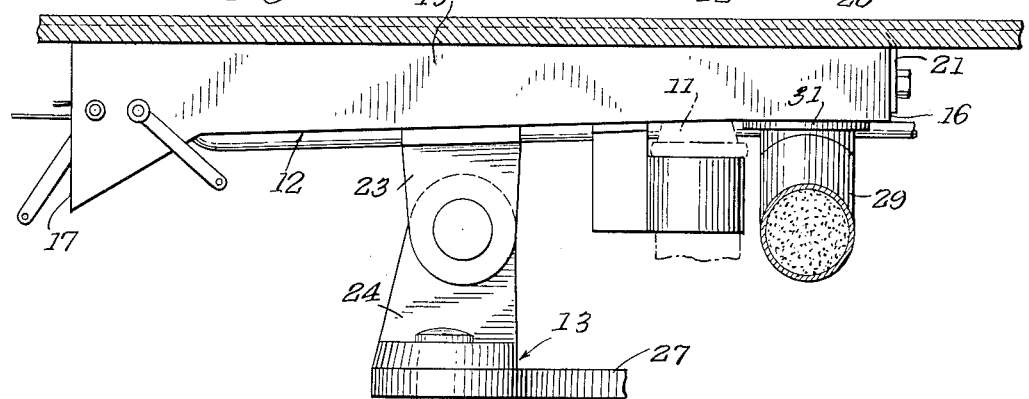
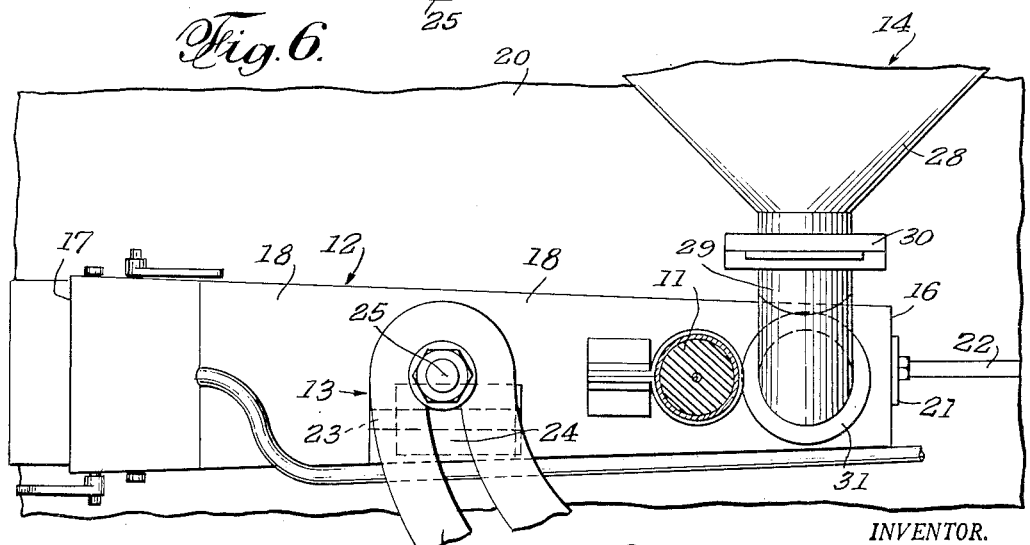
INVENTOR.
REA A. CLOTFELTER
BY
C. G. Stratton
ATTORNEY

United States Patent Office 2,732,470
Patented Jan. 24, 1956

2,732,470

FLUX CONTROL APPARATUS

Rea A. Clotfelter, South Gate, Calif.

Application October 25, 1954, Serial No. 464,268

7 Claims. (Cl. 219—8)

This invention relates to apparatus for controlling the flow of flux in means to carry out automatic or semi-automatic submerged arc welding.

In welding of the electric submerged arc process as used in fusing together the abutting edges of large and relatively thick plates, such as in building, tank and ship construction, the process, in order to be economically practical, should be both rapid and efficient. It has been found that the flow of flux and its control is important with regard to both speed and efficiency of weld. Recognizing the foregoing, it is an object of the present invention to provide improved means for controlling flow of flux in submerged arc welding.

Another object of the invention is to provide flux-controlling apparatus that is adjustable, as desired, to weld along a vertical, horizontal or angular path.

A further object of the invention is to provide means, in apparatus of the character indicated, that serves as flux-releasing gate means.

Generally, the invention contemplates a non-compacting flow of flux that is so applied to the area of weld that the same affords a stable flux bed that becomes the principal medium for supporting the overlying molten flux layer deposited on a seam or joint being welded. It is a still further object of the invention to provide apparatus to carry out the above.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a side elevational view of the present apparatus arranged for welding in a vertical path.

Fig. 2 is a longitudinal sectional view thereof as taken on line 2—2 of Fig. 1.

Figs. 3 and 4 are enlarged cross-sectional views as taken on lines 3—3 and 4—4, respectively, of Fig. 1.

Fig. 5 is a plan view showing the apparatus arranged to weld along a horizontal path, the hopper of said apparatus being removed.

Fig. 6 is a front elevational view of the apparatus as in Fig. 5.

Fig. 7 is a broken and partly sectional view of the edge of a side wall of control hopper means used in the invention.

The apparatus hereinafter described in detail is mounted on and made to be a component of a conventional welding head 10 of automatic or semi-automatic design and embodying an electrode 11 that performs a submerged arc weld. The welding head, shown in dot-dash lines, in practice is suspended or otherwise supported in a manner to track along a seam defined by the abutting edges of two plates to be welded together. Consequently, since the present apparatus is carried by said head, the same moves with the head.

The flux-controlling apparatus that is illustrated comprises, generally, a flux control hopper 12 mounted to be adjustably rotated around the axis of electrode 11, means 13 connecting the hopper 12 and head 10 to lock the adjustment above mentioned, a supply hopper 14 mounted to be adjustably rotated relative to the control hopper on an axis adjacent to the axis of the electrode, and means 15 is the outlet end of the control hopper to regulate the escape of flux therefrom.

The flux control hopper 12 preferably comprises an elongated channel-sectioned housing that, as seen in Figs. 1 and 2, is substantially continuously flared from its closed end 16 to its open or discharge end 17. Said hopper is formed by a front wall 18 and side walls 19 (Fig. 3), the edges of the latter being straight and aligned so as to fit against plates 20 that are to be welded. In practice, the closed end 16 of the control hopper is provided with a gauge or guide member 21 which is designed to intrude into the welding groove 22 defined between the abutted edges of plates 20. Said member 21 tracks in groove 22 and thus serves to align the electrode 11 with said groove. The latter extends into hopper 12 so as to be directed into the welding groove 22. The connection between the electrode 11 and the wall 18 of hopper 12 is a rotatable one to enable rotational adjustment of said hopper relative to the welding head 10.

The means 13 is shown as a bracket 23 extending forwardly from the wall 18 of control hopper 12, a member 24 pivotally connected to said bracket and mounting a stud 25, and a bracket 26 fastened to the welding head 10 and provided with a slotted quadrant 27. Said stud 25 extends through the slot of said quadrant and can be locked to lock the member 24 to the quadrant in any adjusted position of one relative to the other. Therefore, the control hopper can be adjusted around the axis of electrode 11 and locked in either the vertical position of Fig. 1, the horizontal position of Fig. 2, or in any desired angular position in between.

The supply hopper 14 comprises a bin 28 that is connected to control hopper 12 by a reduced conduit 29, the conduit embodying a right angle bend so that the two hoppers 12 and 14 are disposed in parallel planes. Said conduit is provided with a control gate 30 that may be adjusted, in the usual manner, to regulate flow of flux from bin 14, through conduit 29, into control hopper 12.

The connection 31 between conduit 29 and hopper wall 18 comprises a swivel. Thus, hopper 14 can be maintained upright irrespective of the angular disposition of hopper 12. Said swivel is preferably disposed between the closed end 16 of hopper 12 and where electrode 11 enters the same.

The means 15 is shown as a gate or valve 32 disposed across the lower end of control hopper 12 and carried on a rod 33 to extend forwardly into contact with the lower forwardly angled portion 34 of wall 18. Spring means 35 is provided to normally hold said gate closed and the tension thereof may be adjusted to allow escape of surplus flux accumulated in control hopper 12.

Said means 15 further includes a gate or valve 36 that preferably comprises spring wire strands that are carried by a rod 37 and extend oppositely to the direction of gate 32 and into contact with the plates 20. Gate 36 constitutes a wire brush that is adapted to conform to the contours of any irregularities in the plates 20 at or adjacent the line of weld. Spring means 38 is provided to normally bias the brush gate into operative position as in Fig. 1.

The gates 32 and 36 are so disposed that the latter is above the former and supports the flux in hopper 12. Surplus flux falls onto gate 32 and is supported only according to the set tension of spring means 35. Flux released by gate 32 may be collected in any manner and, after drying and screening, the same may be re-used.

In practice, the brush 36 is kept cool by releasing thereon a small amount of water as by means of a spray head 39 supplied by a pipe 40.

As can be seen in Figs. 1 and 2, the flaring control chute or hopper 12 is provided internally with a self-moving flux-compacting conveyor 41 that serves to compact the flux against the seam being welded to provide a stable support bed, as contemplated. Said conveyor comprises a belt 42 trained over pulleys 43 mounted in a frame 44. A series of idler rollers 45 is used to back up the run of the belt that is adjacent the plates 20.

Said conveyor 41 is disposed behind electrode 11 while ahead of said electrode there is provided a flux-directing apron 46 that directs flux flow from conduit 29 directly against the grooves 22 between plates 20. It will be evident that, as the control hopper (as in Fig. 1) moves in an upward direction, or to the right (as in Fig. 5), the flux being discharged into said hopper is compacted by the conveyor against the seam to be welded. Said conveyor, in the process, moves in the direction of arrow 47 (Fig. 1).

Since it is important that the flux be confined in control hopper 12 and not spill laterally from between plates 20 and the edges of hopper walls 19, said edges may be so treated as to conform to curved plates 20, for instance. As shown in Figs. 1 and 7, each said edge is provided with a concave curvature indicated at 48, and a U-sectioned elongated shoe 49 is provided in which each said edge is disposed. Bolts 50 at the ends of the control hopper mount said shoes which, because of their length, are sufficiently flexible to conform to a convex surface and provide the non-spilling sealing engagement between hopper and plates that is desired.

From the foregoing, it will be understood that flux for a submerged arc weld is so controlled that the same forms a support bed and is maintained in the area or vicinity where the weld takes place, the flux, of comminuted form, being free-flowing as the apparatus is moved upwardly while welding vertically or to the right while welding horizontally.

Of course, the flux is provided to suit welding conditions and different types of metal being welded. Also, the joints at the weld may vary, as is common.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. In welding apparatus, means to control flow of flux, said means comprising a longitudinally flared control hopper of channel-shaped cross-section, said hopper being connected between its ends to a welding head, a flux-feeding hopper connected by a swivel to one end of said control hopper and located to one side of said welding head, the other end of said control hopper being open, and flux-flow-regulating means in said hopper adjacent said open end.

2. In welding apparatus, means to control flow of flux, said means comprising a flared control hopper of channel shaped cross-section, a flux-feeding hopper connected by a swivel to one end of said control hopper and located to one side of the electrode of a welding head connected to said hopper, the other end of said control hopper being open, flux flow regulating means in the hopper adjacent said open end, and flux-bed-forming means within said hopper between the electrode and the regulating means.

3. In combination, a welding head having an electrode, a flux-controlling hopper connected to said electrode and carried by said head, means for rotationally adjusting the hopper relative to the head, a self-moving flux-bed-forming conveyor within the hopper, a flux-feeding hopper and a rotational connection between said hopper and the control hopper so that the former may be maintained upright during vertical, horizontal and all angular dispositions of the latter.

4. In combination, a welding head having an electrode, a flux-controlling hopper connected to said electrode and carried by said head, means for rotationally adjusting the hopper relative to the head, a self-moving flux-bed-forming conveyor within the hopper and disposed between the electrode and the discharge end of the hopper, and flux-flow-regulating means in the hopper adjacent said discharge end and controlling discharge of flux that is passed by the conveyor, a flux-feeding hopper and a rotational connection between said hopper and the control hopper so that the former may be maintained upright during vertical, horizontal and all angular dispositions of the hopper.

5. In flux-controlling apparatus, a longitudinally flared hopper having a flux inlet at its smaller end and open at its larger end, a conveyor disposed within said hopper and receptive of flux to compact the same against a seam and over which the hopper is placed, and a wire brush gate within said hopper, said gate being located behind said conveyor.

6. In flux-controlling apparatus, a longitudinally flared hopper having a flux inlet at its smaller end and open at its larger end, a conveyor disposed within said hopper and receptive of flux to compact the same against a seam and over which the hopper is placed, and regulating means adjacent the open end of the hopper and controlling outward flow of flux passed by the conveyor.

7. In a welding apparatus, the combination comprising a longitudinally flared control hopper, a welding head adjustably connected to said hopper between its ends, a flux-feeding hopper connected by a swivel to one end of said control hopper and located to one side of said welding head, a flux-flow regulating means within said control hopper adjacent the other end, said means including a wire brush gate, and a conveyor disposed within said control hopper between said welding head and said regulating means to compact the flux.

References Cited in the file of this patent
UNITED STATES PATENTS

| | | |
|---|---|---|
| 2,364,826 | Smith | Dec. 12, 1944 |
| 2,367,257 | Baird | Jan. 16, 1945 |
| 2,673,916 | Meyer | Mar. 30, 1954 |